United States Patent [19]
Babbitt

[11] Patent Number: 5,412,195
[45] Date of Patent: May 2, 1995

[54] HIGH SECURITY SPECTRAL CODE STRIP

[75] Inventor: Stephen T. Babbitt, Redondo Beach, Calif.

[73] Assignee: Hughes Aircraft Company, Los Angeles, Calif.

[21] Appl. No.: 998,110

[22] Filed: Dec. 29, 1992

[51] Int. Cl.$^6$ .............................................. G06K 7/10
[52] U.S. Cl. .................................... 235/457; 235/454
[58] Field of Search ................... 235/454, 457; 356/71; 359/15

[56] References Cited

U.S. PATENT DOCUMENTS

| | | | |
|---|---|---|---|
| 3,622,220 | 11/1971 | Kogelnik | 359/15 |
| 3,717,412 | 2/1973 | Takuma | 356/71 |
| 3,753,249 | 8/1973 | Silverman | 235/457 |
| 3,776,616 | 12/1973 | Douklias | 356/71 |
| 3,995,146 | 11/1976 | Tetrev | 235/457 |
| 3,998,572 | 10/1976 | Constant | 235/457 |
| 4,253,723 | 3/1981 | Kojima | 235/457 |
| 4,376,887 | 3/1983 | Greenaway | 235/457 |
| 4,412,719 | 11/1983 | Fienup | 359/15 |
| 4,591,242 | 5/1986 | Broockman | 235/457 |
| 4,930,847 | 6/1990 | Cederquist | 359/15 |
| 5,142,383 | 8/1992 | Mallik | 356/71 |

OTHER PUBLICATIONS

Tedesco J. M. et al., "Principles and Spectroscopic . . . " Analytical Chem. vol. 65, No. 9, May 1, 1993.

Primary Examiner—Harold Pitts
Attorney, Agent, or Firm—L. A. Alkov; W. K. Denson-Low

[57] ABSTRACT

An encoded hologram strip including a plurality of hologram digits linearly arranged along a longitudinal direction, each hologram digit including at least 0 parallel fringe reflection holograms wherein each parallel fringe hologram is constructed to diffract playback light having a predetermined wavelength and incidence angle at a diffraction angle that is substantially equal to the playback incidence angle.

5 Claims, 3 Drawing Sheets

HIGH SECURITY SPECTRAL CODE STRIP

BACKGROUND OF THE INVENTION

The disclosed invention is generally directed to security encoding on identification cards, credit cards, and the like, and more particularly to a spectral code strip that contains information encoded in the form of holograms of different colors.

Identification cards, credit cards, and the like are widely utilized for security purposes, and commonly include human readable information as well as machine readable security information contained on a magnetic strip for example.

An important consideration with known machine readable encoding techniques is the possibility of counterfeiting, alteration, sensitivity to surface damage, and the desire for additional security.

SUMMARY OF THE INVENTION

It would therefore be an advantage to provide a machine readable encoded strip for identification cards and the like which is not readily counterfeited or altered, and is not sensitive to surface damage.

Another advantage would be to provide a machine readable encoded strip for identification cards and the like which would provide security in addition to known techniques.

The foregoing and other advantages are provided by the invention in an encoded hologram strip comprising a plurality of hologram digits linearly arranged along a longitudinal direction, each hologram digit including at least 0 parallel fringe reflection holograms wherein each parallel fringe hologram is constructed to diffract playback light having a predetermined wavelength and incidence angle at a diffraction angle that is substantially equal to the playback incidence angle.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
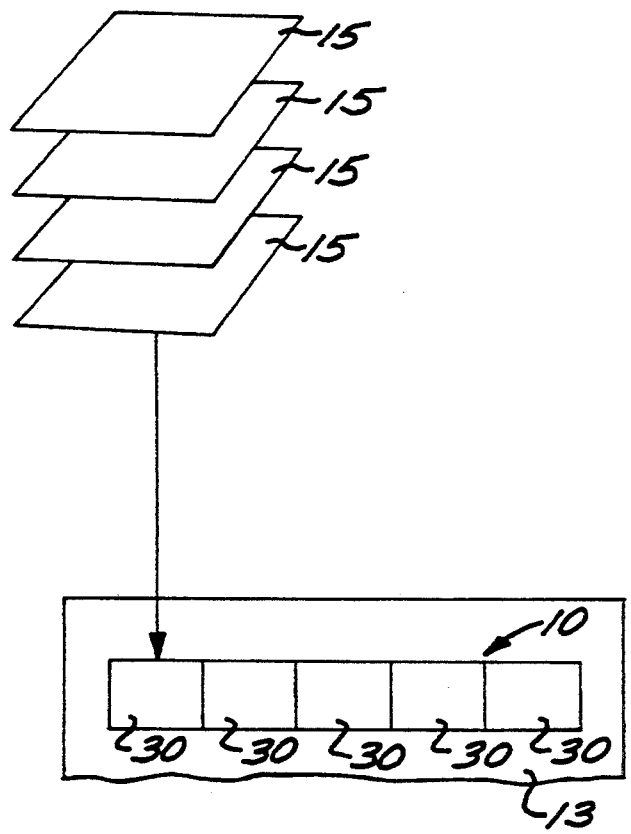
FIG. 1 is a schematic illustration of an encoded hologram strip in accordance with the invention.

In the following detailed description and in the several figures of the drawing, like elements are identified with like reference numerals.

Referring now to FIG. 1, schematically illustrated therein is an encoded hologram strip 10 in accordance with the invention disposed, for example, on a substrate 13 that forms part of a credit card, identification card, or the like. The encoded hologram strip is comprised of a plurality of small holographic code elements or digits 30 arranged side by side in a linear array, for example contiguously as shown in FIG. 1. Each holographic digit 30 is comprised of at least one parallel fringe reflection hologram or mirror hologram. For ease of reference, a parallel fringe reflection hologram as contained in a holographic code element 30 shall be called a holographic key. Each holographic digit 30 that can be comprised of a stack of respective hologram layers 15 wherein each layer contains a single hologram, as shown in FIG. 1. Also, each holographic digit 30 can be comprised of a single hologram layer in which a plurality of holographic keys have been recorded, or a plurality of hologram layers each having a plurality of holograms formed therein. By way of illustrative example, each holographic digit can recorded in one or more layers that are distinct for each holographic digit, or all holographic digits can be recorded in one or more layers extend across all digits and contains all the holographic keys for all digits. It should be appreciated that the hologram digits can be separated by spaces which can contain other information that can be utilized in the reading of the encoded hologram strip, for example for correlating the holographic keys with their associated digits if desired. Also, non-hologram containing digits can be interleaved with the hologram digits for further encoding combinations.

Each parallel fringe holographic key in the encoded hologram strip 19 is recorded to reflect light of a predetermined wavelength at a predetermined playback incidence angle by reflecting such light at an angle that is substantially equal to the playback incidence angle. In other words, each holographic key is configured to function like a mirror at predetermined playback wavelength and incidence angle combination, herein called a wavelength/angle combination. In accordance with the invention, each holographic key in a particular application of the encoded hologram strip is configured for one of a set of different predetermined wavelength/angle combinations. By way of illustrative example, the set of predetermined wavelength/angle combinations can comprise five wavelengths at the same angle, which provides for five different wavelength/angle combinations. As another example, the set of wavelength/angle combinations can comprise four wavelengths at a first angle and one of such wavelengths at a second angle that is different from the first angle, which also provides for five different wavelength/angle combinations.

Each of the holographic keys of the encoded holographic strip is more particularly configured to diffract its peak wavelength along an axis that is orthogonal to the longitudinal axis of the encoded hologram strip and coplanar with the axis of the playback light. Pursuant to such configuration, the encoded hologram strip can be read by moving the strip along its longitudinal axis across one or more appropriately configured light beams and optically detecting the presence or absence of reflections. Examples of optical detection circuitry for reading the encoded hologram strip will be discussed further herein.

As to selection of the predetermined wavelength/angle combinations, the peak wavelengths selected will depend on the bandwidths of the light sources utilized to read the encoded hologram strip as well as capabilities of the particular mechanism utilized to detect the colors of the hologram keys. Further, in order to further insure discrimination between the different peak wavelengths utilized, only non-adjacent peak wavelengths should be utilized in any give holographic code digit.

Figure 2:
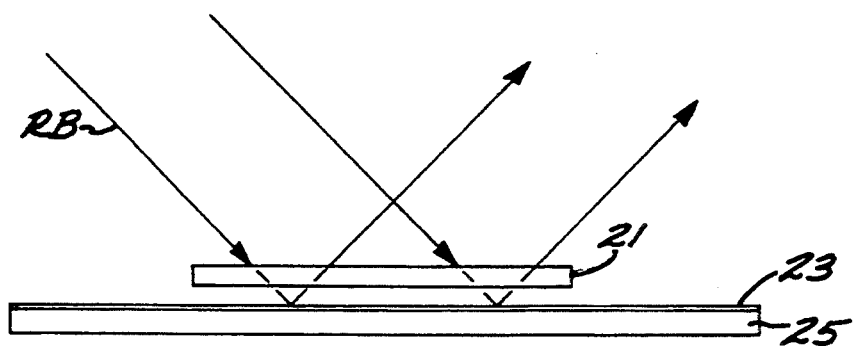
FIG. 2 is a schematic illustration of an exposure system for constructing hologram elements of the encoded hologram strip of FIG. 1.

Referring now to FIG. 2, schematically depicted therein by way of illustrative example is an exposure system for recording a parallel fringe reflection hologram for use as a holographic key in the encoded holographic strip of the invention. A holographic recording layer 21 is positioned adjacent and parallel to a reflecting surface 23 of a first surface mirror 25. Exposure illumination is provided by a reference beam RB at an angle and wavelength appropriate for the wavelength/angle combination intended for the recorded hologram. The reference beam passes through the hologram recording layer and is reflected by the reflection surface of the first surface mirror. The reflected beam forms an object beam that interferes with the reference beam to form hologram fringes.

An encoded hologram strip in accordance with FIG. 1 can be read by an optical analyzer that determines which keys are present in the hologram strip. By way of illustrative example, such optical analyzer can illuminate the holographic digits with colored light and detect the diffractions from the digits with color insensitive detection elements. As another example, such optical analyzer can illuminate the holographic digits with white light and detect the diffractions from the digits with color sensitive detection elements. In either case, a plurality of channels can be utilized to detect respective predetermined wavelength/angle combinations, or a single channel can be utilized to detect predetermined wavelength/angle combinations each having the same angle.

Figure 3:
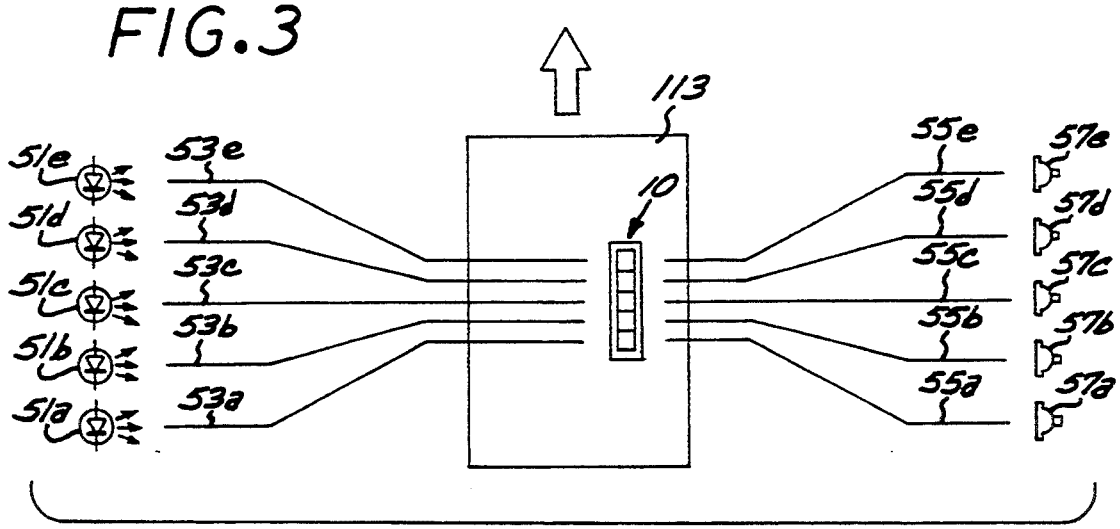
FIG. 3 is a block diagram of an example of an optical analyzer for reading the encoded hologram strip of FIG. 1.

Referring now to FIG. 3, set forth therein is a schematic block diagram of an optical analyzer for reading a holographic code strip in accordance with the invention. The optical analyzer is premised on the particular example wherein each holographic key of the encoded strip is configured for one of a set of five different predetermined wavelength/angle combinations. The optical analyzer of FIG. 3 includes five input fiber optic lines 53a, 53b, 53c, 53d, 53e for delivering light to a location that is adjacent the path to be traversed by the holographic code strip. The input fiber optic lines are respectively associated with the five different predetermined wavelength/angle combinations, and the output ends of the input fiber optic lines 53a through 53e are particularly configured to provide output beams at the playback angles respectively associated therewith. Output fiber optic lines 55a, 55b, 55c, 55d, 55e respectively associated with the input fiber optic lines 53a, 53b, 53c, 53d, 53e have receiving ends located adjacent the path traversed by the holographic code strip in respective angular positions for receiving light at the predetermined diffraction angles respectively associated with the input fiber optic lines 53a through 53e. That is, an output fiber optic line is responsive to light that is at the angle associated with the corresponding input fiber optic line.

The light inputs to the input fiber optic lines 53a through 53E comprise beams having peak wavelengths that respectively correspond to the wavelengths associated with input fiber optic lines 53a through 53e, and are provided, for example, by LEDs 51a, 51b, 51c, 5d, 51e that produce light having the appropriate peak wavelengths. Also by way of example, the outputs of the respective output optical fibers 55a, 55b, 55c, 55d are provided to respective optical detectors 57a, 57b, 57c, 57d which provide respective outputs indicative of the presence of light at the appropriate angle at the inputs of the output optical lines.

In the optical analyzer of FIG. 3, five optical channels are formed wherein each channel is comprised of an LED, an input fiber optic line, and an output fiber optic line. Each optical channel has an associated wavelength/angle combination, as defined by the light input to the input fiber optic line and the playback angle defined by the output of the fiber optic line, and provides an output indicative of the presence of a hologram key that is configured for the wavelength/angle combination associated with such optical channel. More particularly, the playback illumination provided by the input fiber optic line of an optical channel is of a predetermined wavelength and angle, and if a hologram key configured for such wavelength and angle receives such playback illumination, the associated output fiber optic line will receive a bright diffraction output from the holographic key, which will cause the optical detector associated with the optical channel to produce an output. In other words, each optical channel is tuned to a predetermined wavelength and angle, and the color discrimination function is provided at the inputs to the input fiber optic lines 53a through 53e.

In operation, all the LEDs are illuminated when a holographic code strip 10 disposed on a card 113 is moved along the fiber optic inputs and outputs. Since each optical channel is tuned to a predetermined wavelength and angle, the optical detector of an optical channel will provide an output when a holographic key configured for the predetermined wavelength/angle combination of the optical channel is illuminated by the input fiber optic line of the optical channel. Thus, as a holographic code strip is moved along the fiber optic inputs and outputs, the optical detectors provide outputs pursuant to the presence of holographic keys configured for the predetermined wavelength and angle combinations of the optical channels.

Figure 4:
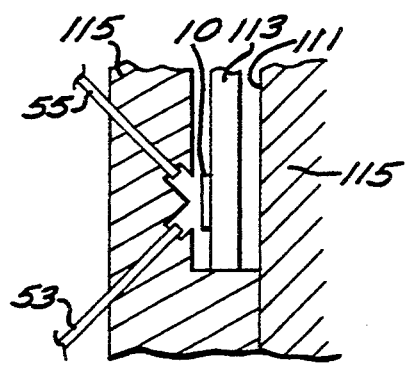
FIG. 4 is a schematic sectional view illustrating an example of an installation of the fiber optic lines of the optical analyzer of FIG. 3.

Referring now to FIG. 4, the optical analyzer of FIG. 3 can be implemented by way of illustrative example in a card reader that includes a channel 111 in which a card 113 containing an encoded hologram strip in accordance with the hologram strip 10 of FIG. 1 can be moved along a linear path defined by the channel. The channel 113 is formed by opposing walls 115, and the output ends of the input fiber optic lines 53a through 53e and the input ends of the output fiber optic lines 55a of the optical analyzer of FIG. 3 can be secured in one of the walls of the channel, as represented generally by fiber optic lines 53 and 55 in FIG. 4, such that their ends are at the appropriate angle relative to the contemplated path that will be traversed the encoded hologram strip 10.

Referring more particularly to the optical analyzer of FIG. 3, it should be appreciated that the output ends of the input fiber optic lines 53a through 53e are collinear on a line that is parallel to the linear path travelled by the encoded hologram strip 10, and that the input ends of the output fiber optic lines 55a through 55e are also be collinear on a line that is parallel to such linear travel path.

Figure 5:
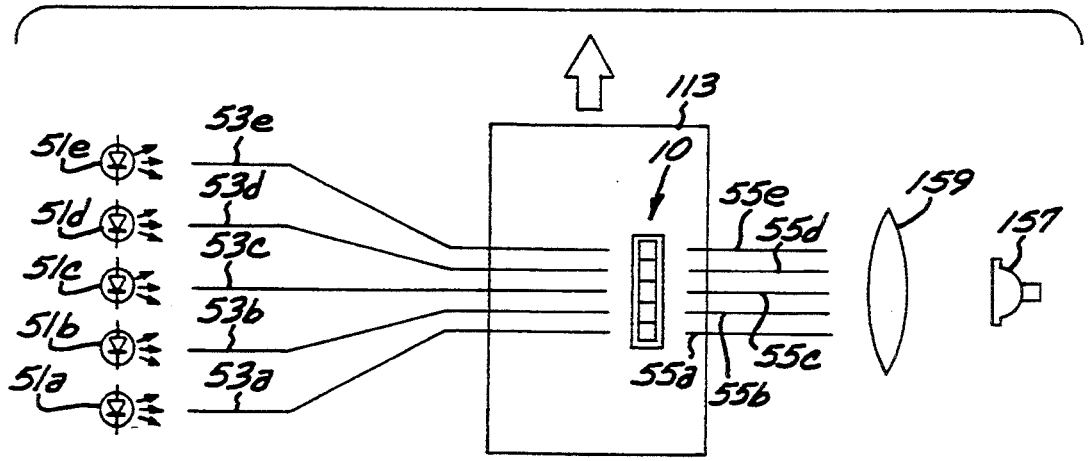
FIG. 5 is a block diagram of a further example of an optical analyzer for reading the encoded hologram strip of FIG. 1.

Referring now FIG. 5, set forth therein is a schematic block diagram of a further example of an optical analyzer for reading a holographic code strip in accordance with the invention. The optical analyzer of FIG. 5 is similar to the optical analyzer of FIG. 3 except that the outputs of the output fiber optic lines 55a through 55e are provided to an optical detector 157 via a lens 159. Five optical channels, each tuned to a predetermined wavelength/angle combination, are formed by the LEDs, the input fiber optic lines, and the output fiber optic lines, wherein each channel is comprised of an LED, an input fiber optic line, and an output fiber optic line.

In operation, the LEDs are individually and sequentially pulsed at an appropriate rate while the holographic code strip 10 is moved along the output ends of the input fiber optic lines. The optical detector provides an output whenever an optical channel illuminates a holographic key configured for the predetermined wavelength/angle combination of such channel, and the outputs of the optical detector are electronically correlated with the pulsing of the LEDs to associate the detector outputs with the respective wavelength/angle combinations of the optical channels.

Figure 6:
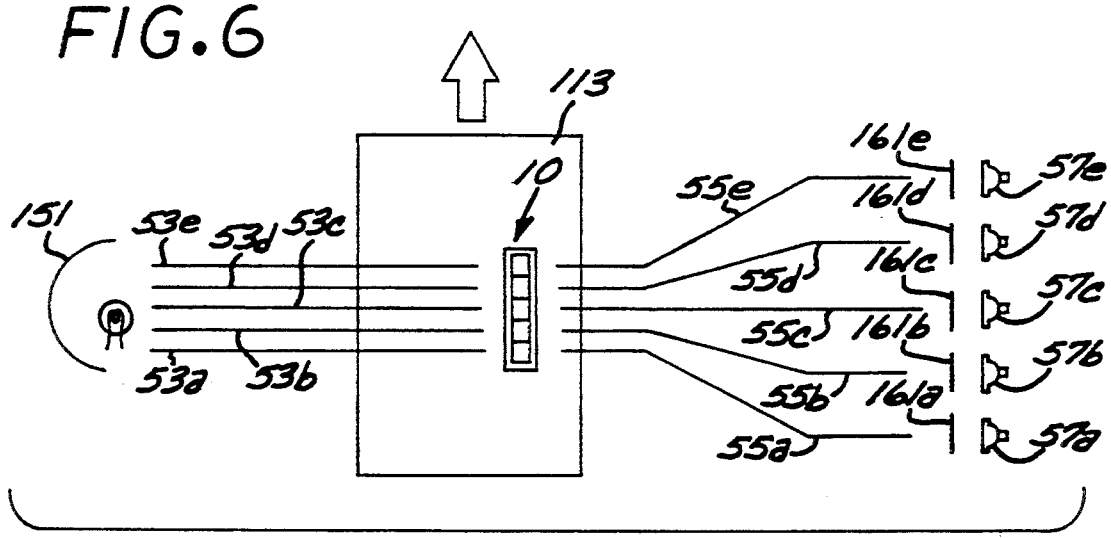
FIG. 6 is a block diagram of yet another example of an optical analyzer for reading the encoded hologram strip of FIG. 1.

Referring now FIG. 6, set forth therein is a schematic block diagram of another example of an optical analyzer for reading a holographic code strip in accordance with the invention. The optical analyzer of FIG. 6 includes input fiber optic lines 53a through 53e and output fiber optic lines 55a through 55e as in the optical analyzers of FIGS. 3 and 5. The input light to the fiber optic lines 53a through 53e is provided by a single white light source 151, and the optical outputs of the output optical fiber lines 55a through 55e are filtered by respective bandpass filters 161a, 161b, 161c, 161d, 161e, each filter having a peak transmission wavelength that corresponds to the predetermined wavelength associated with the optical channel that provides the input for such filter. The filtered outputs of the filters 161a through 161e are detected by respective detectors 57a through 57e of a detector array.

In the optical analyzer of FIG. 6, respective optical channels are formed wherein each channel is comprised of an input fiber optic line, an output fiber optic line, and a bandpass filter. Each optical channel is tuned to a predetermined wavelength/angle combination, as defined by the playback angle defined by the output of the fiber optic line and the bandpass filter which is tuned to transmit only light of the wavelength of such predetermined wavelength/angle combination. The detector associated with a particular channel provides an output indicative of the presence of a hologram key for the predetermined wavelength/angle for which the optical channel is tuned. More particularly, the playback illumination provided by the input fiber optic line of an optical channel is white light of a predetermined angle, and if a hologram key configured for wavelength/angle of the optical channel, a bright diffraction output will be received by the output fiber optic line of the optical channel and transmitted by the bandpass filter of the optical channel, which will cause the optical detector associated with the optical channel to produce an output. The bandpass filter for each optical channel insures that only light of the predetermined wavelength for that channel is detected.

In operation, the white light source 151 is on as a holographic code strip is moved along the fiber optic inputs and outputs. Since each optical channel is tuned to a predetermined wavelength and angle, the optical detector of an optical channel will provide an output when a holographic key configured for the predetermined wavelength and angle of the optical channel is illuminated by the input fiber optic line of the optical channel. Thus, as a holographic code strip is moved along the fiber optic inputs and outputs, the optical detectors provide outputs pursuant to the presence of holographic keys configured for the predetermined wavelength and angle combinations of the optical channels.

Figure 7:
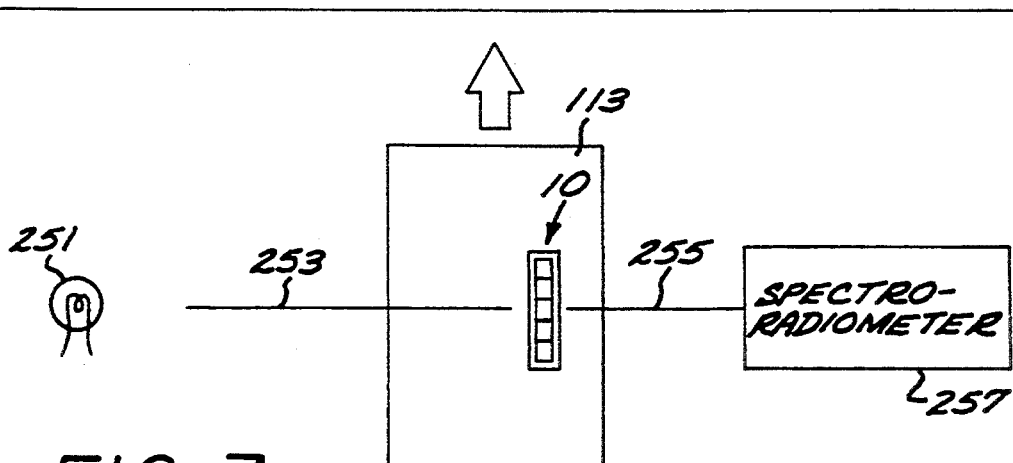
FIG. 7 is a block diagram of another example of an optical analyzer for reading the encoded hologram strip of FIG. 1.

Referring now FIG. 7, set forth therein is a schematic block diagram of a further example of an optical analyzer for reading a holographic code strip in accordance with the invention. The optical analyzer is premised on the particular example wherein each holographic key of the encoded strip is configured for one of a set of different predetermined wavelength/angle combinations wherein each combination has the same angle. The optical analyzer in particular includes an input fiber optic line 253 for delivering light to a location that is adjacent the path to be traversed by the holographic code strip. The output end of the input fiber optic line 253 is particularly configured to provide an output beam at the predetermined playback angle intended for the hologram keys of the encoded hologram strip. An output fiber optic line 255 has a receiving end located adjacent the path traversed by the holographic code strip in respective angular position for receiving the reflection at the predetermined diffraction angle defined for the holographic keys of the hologram strip. The output of the output fiber optic line 255 is provided to a spectroradiometer 257 which analyzes the color of the light provided thereto and is configured to provide an output pursuant to detection of light having a wavelength that corresponds to one of the wavelengths of the predetermined wavelength/angle combinations. Thus, the optical analyzer of FIG. 7 provides outputs indicating detection of one of the predetermined wavelengths.

By way of illustrative example, the fiber optic lines of the optical analyzer of FIG. 7 can be implemented in a card reader in the manner schematically depicted in FIG. 4 and described earlier relative to FIG. 3, except that only one input fiber optic line and only one output fiber optic line are utilized.

In the foregoing optical analyzers, although fiber optic lines have been disclosed as one means for communicating light from one location to another, it should be appreciated that other light communicating means can be utilized such as lenses. Alternatively, the light source(s) and/or optical detecting elements can be positioned closer to the path travelled by the encoded hologram strip.

The outputs of an optical analyzer such as those disclosed herein can be correlated with corresponding hologram digits of an encoded hologram strip by various methods. For example, in a technique that can be implemented with both single and multiple channel optical analyzers, the card having an encoded hologram strip is provided with an encoded magnetic strip having specific bit positions that correspond to the hologram digit positions. The magnetic strip is read as the encoded hologram strip is read, and the bit positions of the magnetic strip identify the corresponding hologram digit locations. For example, when a particular magnetic bit location is located by the magnetic strip reader, the hologram key(s) detected by the optical analyzer would be assigned to the hologram digit that corresponds to that particular magnetic bit location.

A further technique for correlating detected hologram keys to hologram digits involves the provision of highly reflective regions at each end of the encoded hologram strip and between hologram digits. In the optical analyzer that reads the hologram strip, the light reflected by the highly reflective regions will be brighter than the diffraction from the hologram keys, and thus signal the start and end of the encoded hologram strip, as well as the boundaries between hologram digits. This technique can be implemented with single channel optical analyzers as well as multiple channel optical analyzers.

Another technique for correlating detected hologram keys with the hologram digits would involve the requirements that a fixed number of keys be present in each hologram digit and that adjacent digits cannot be identical. This technique requires an optical analyzer having a single optical channel, and each digit is defined by the concurrent detection of the correct number of keys.

The foregoing has been a disclosure of a machine readable encoded hologram strip that is useful for credit cards, identification cards, and the like. An encoded hologram strip in accordance with the invention is not readily counterfeited or altered, is not sensitive to surface damage, and can be utilized to provide for additional security when used in conjunction with a magnetic strip.

Although the foregoing has been a description and illustration of specific embodiments of the invention, various modifications and changes thereto can be made by persons skilled in the art without departing from the scope and spirit of the invention as defined by the following claims.

What is claimed is:

1. An encoded hologram strip comprising a plurality of hologram digits linearly arranged along a longitudinal direction, each hologram digit including at least one parallel fringe reflection hologram wherein each parallel fringe hologram is constructed to diffract playback light having a predetermined wavelength and incidence angle combination at a diffraction angle that is substantially equal to the playback incidence angle, and wherein the predetermined wavelength and incidence angle combination for each of said parallel fringe holograms is one of a set of predetermined wavelength and incidence angle combinations.

2. The encoded hologram strip of claim 1 wherein said playback incidence angle and said diffraction angle are in a plane that is orthogonal to the longitudinal direction of the encoded hologram strip.

3. The encoded hologram strip of claim 1 wherein the predetermined wavelength and incidence angle combinations includes a plurality of wavelengths.

4. The encoded hologram strip of claim 3 wherein one of said hologram digits contains a plurality of parallel fringe holograms having different predetermined wavelengths which are not adjacent to each other in wavelength.

5. An encoded hologram assembly comprising a plurality of hologram digits, each hologram digit including at least one parallel fringe reflection hologram wherein each parallel fringe hologram is constructed to diffract playback light having a predetermined wavelength and incidence angle combination at a diffraction angle that is substantially equal to the playback incidence angle, and wherein the predetermined wavelength and incidence angle combination for each of said parallel fringe holograms is one of a set of predetermined wavelength and incidence angle combinations.

* * * * *